Jan. 6, 1925.  1,521,851
A. O. ABBOTT, JR
VULCANIZING SYSTEM
Filed Aug. 18, 1923  2 Sheets-Sheet 2

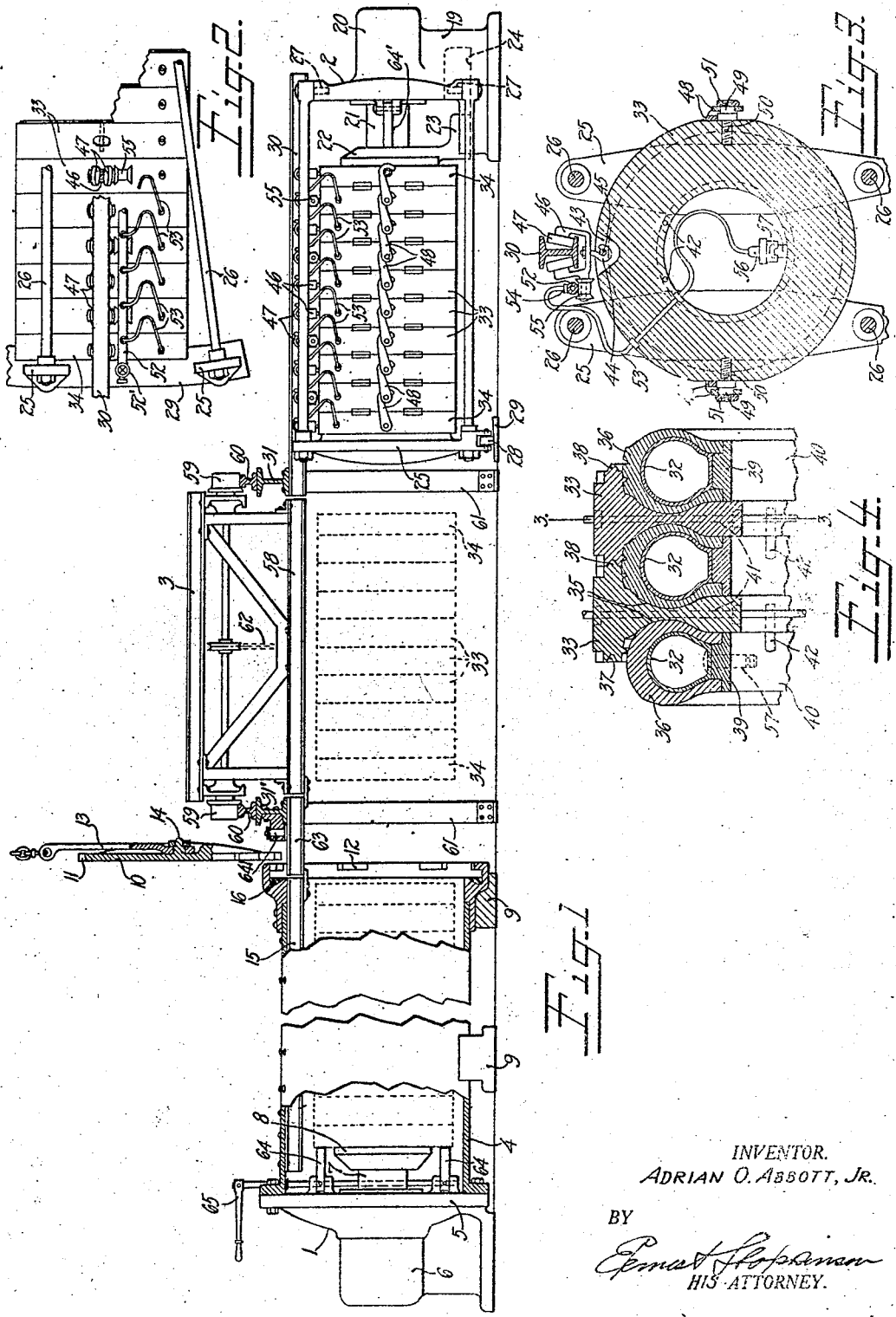

INVENTOR.
ADRIAN O. ABBOTT, JR.
BY
HIS ATTORNEY.

Patented Jan. 6, 1925.

1,521,851

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

VULCANIZING SYSTEM.

Application filed August 18, 1923. Serial No. 658,043.

*To all whom it may concern:*

Be it known that I, ADRIAN O. ABBOTT, Jr., a citizen of the United States, residing at Detroit, county of Wayne, and State of Michigan, have invented a certain new and useful Vulcanizing System, of which the following is a full, clear, and exact description.

This invention relates to a vulcanizing system, and more particularly one suited for curing tires.

Heretofore, tires, both solid and pneumatic, have been cured in "French" presses which consists of vertically disposed vessels with a long-stroke ram carrying a lower platen that has been raised to the mouth or top of the vessel and then gradually lowered as the molds are placed therein one by one, the upper platen being constituted by a head plate or closure for the vessel. The molds have been emptied and refilled in a great variety of ways and with many different appliances. Recently, conveyer systems for carrying the molds around the press-room horizontally have been proposed and used. Generally, however, these systems require either more labor or more floor space than desirable and take too long to load and unload the vulcanizing presses.

The present invention aims to provide a new and improved vulcanizing system in which a press-load of molds may be cured as a unit, may be sustained always in a vertical position and portably, may be connected up for manipulating and tested out for leakage away from the old uncomfortably hot vulcanizing presses, and may be of a design increasing the capacity of the vulcanizing presses, i. e., the number of tires that may be vulcanized in one heat. Further, it aims to provide a system economical of floor space. Other advantages will appear.

With the illustrated embodiment in mind and without intention to limit more than is required by the prior art, the system may be described, briefly, as one comprising one or more vulcanizing presses and one or more set-up or assembling presses with means intermediate (that is, operatively intermediate) the two types of presses for transferring a press-load or batch of molds, as a unit, from the vulcanizing presses to the set-up presses and vice versa. The molds employed may be and preferably are of a duplex type all of which excepting the end sections are hollowed out on their opposite faces so that the total number of mold sections for loading a vulcanizing press need only be one more in number than the tires cured in one heat.

An embodiment of the invention is illustrated in the accompanying drawings, in which:—

Figure 1 is a diagrammatic sectional elevation of a complete vulcanizing system;

Figure 2 is a fragmentary plan view of a set-up press;

Figure 3 is a vertical section of one of the mold sections taken in the plane approximately of the line 3—3, Figure 4;

Figure 4 is a fragmentary longitudinal section through a few of the mold sections, showing tire casings on sealing-rings and containing air-bags used in one method of curing tires;

Figure 5:
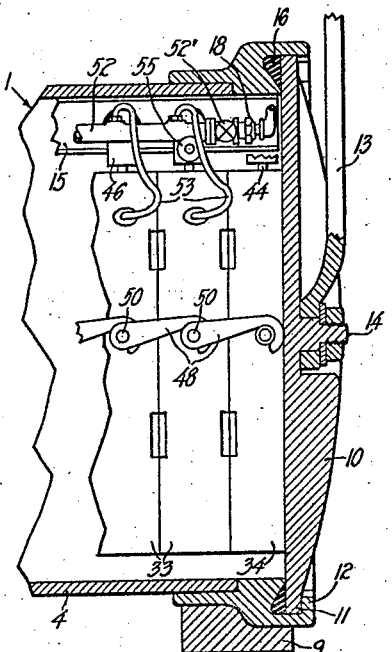
Figure 5 shows one end of a vulcanizing press in longitudinal section with a few molds and a part of the manifold system appearing in elevation.
Figure 6:
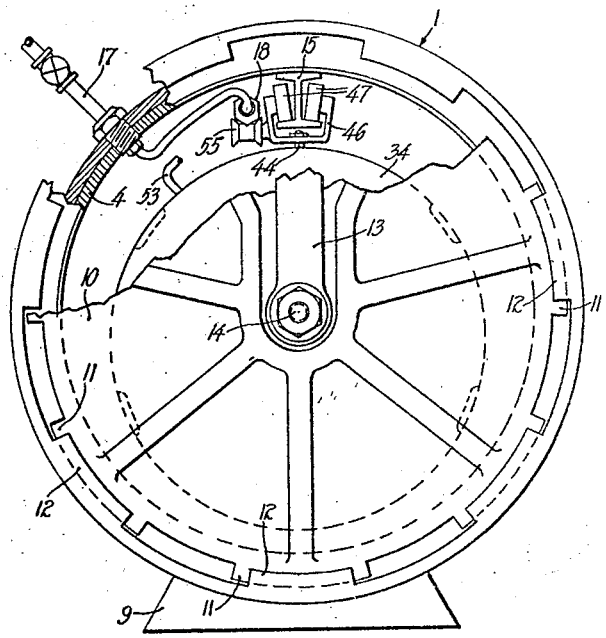
Figure 6 is a front elevation of a vulcanizing press, partly broken away to illustrate the manifold connections and a mono-rail suspension track.
Figures 7, 8:
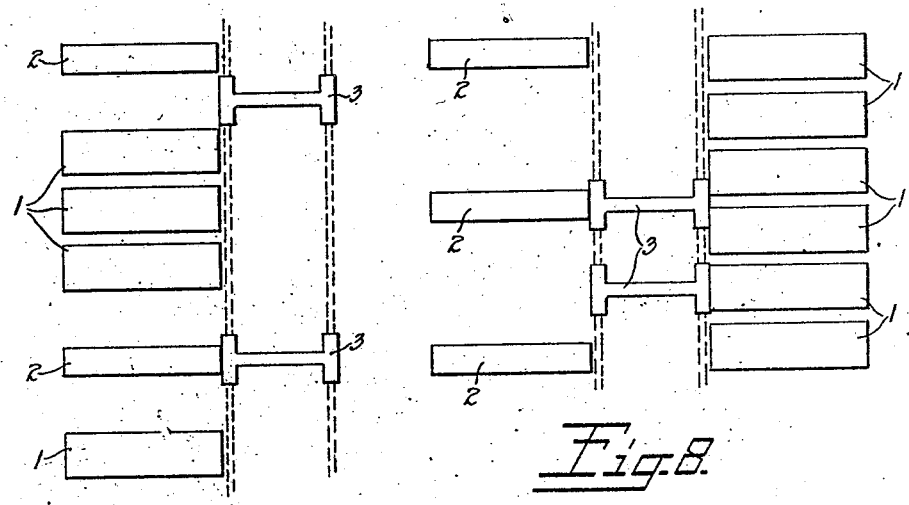

And Figures 7 and 8 are diagrammatic plan views of two different arrangements of vulcanizing presses and set-up presses that may be employed.

In the drawings, the vulcanizing presses are indicated generaly by the numeral 1, the set-up presses by the numeral 2, and the travelling crane by the numeral 3.

*Vulcanizing presses.*—These are arranged horizontally and each comprises a vessel or shell 4, preferably cylindrical, which is closed at one end by an end-wall 5, to which is suitably secured a fluid pressure cylinder 6 operatively supporting a short-stroke ram 7, carrying a movable platen 8. The weight of the vessel is suitably supported by blocks or footings 9. The other end of the press is adapted to be closed by a cover 10, which constitutes, operatively, a fixed platen, this cover 10 being preferably equipped with lugs 11 for engaging behind projections 12 fixed to the vessel 4. Covers of this general type may be locked in position behind the projections 12, or equivalent parts, in a manner well-known, typical means for accomplishing the incident operations being illustrated in the form of a chain-suspended rod 13, having an apertured lower end receiving a pin 14 integral with the cover 10. Ordinarily, a chain-hoist (not shown) is disposed conveniently for raising and lowering the cover 10. Within and in the upper part of the vessel 4 is secured an I-beam 15, from which, molds, hereinafter to be described, may be supported and moved in and out of the press with facility. As usual, the press is provided with a sealing strip or gasket 16. Through the shell or cylinder 4 at a convenient point adjacent the mouth thereof, is passed a valve-controlled pipe 17 which is adapted to be connected with any suitable source of fluid pressure supply, the inner end of this line terminating in a detachable coupling 18, which may be variously constructed for quick connection to a manifold, later to be described.

*Set-up presses.*—These appear at the right in Figure 1 and parts thereof in Figures 2 and 3. Each comprises an immovable head 19 carrying a fluid pressure cylinder 20, in which operates a short-stroke ram 21 carrying a movable platen 22, the latter preferably having a depending lug 23 tracking in a guide-way 24 fashioned in the head 19 and preventing turning of the platen. For cooperation with the movable platen 22, there is provided at the opposite end of the set-up presses, any suitable form of platen that may be shifted laterally in front of the movable platen 22. While this second platen may be variously constructed and operatively supported, it is preferably made in sections 25 of like construction. Each of these is of the bar-like form appearing in Figure 3 and connected at its opposite ends by a pair of heavy rods 26 to the head 19, being hinged thereto, as indicated at 27, so as to permit spreading the platen sections 25 away from each other and on opposite sides of the direction of movement of the molds when loaded or removed from the set-up press. The weight of the platen sections 25 is preferably borne by rollers 28 tracking a floor plate 29. An I-beam 30 is supported centrally above each set-up press, one end thereof resting on the head 19, and the other end secured to a transverse beam 31.

*The molds.*—While any suitable form and construction of mold may be employed, that illustrated in the drawings is preferred because more tires can be accommodated within a given size of vulcanizer therewith. The tires may be cured on air-bags, such as indicated at 32, Figure 4, or with fluid under pressure in direct contact with the interior of the casings, or on cores. The preferred form of molding equipment comprises a plurality of sections 33 and 34, the latter differing from the former only in being faced off on one side where they contact with the press platens. The intermediate mold sections 33 are of duplicate construction and hollowed out on their opposite faces, as indicated at 35, so that each section forms or shapes the exterior of two adjacent tires or casings 36. While dowel pins may be employed to center the sections, I preferably shape their opposite sides near the tread with grooves 37 and annular bevelled ribs 38 shaped to fit within said grooves. The inner peripheries of these mold sections may be variously shaped to close off the inside of the tire casings but for curing on air-bags, or gas direct, they are preferably formed as shown so as to engage the margins or flanged portions 39 of sealing-rings 40, the casings 36 being shown resting on the flanges 39. The sections 33 are preferably apertured, as indicated at 41, to pass branches of a manifold, to be described. Each of the mold sections is preferably equipped on one side with a pair of pins 42 for supporting the casings temporarily and as a matter of convenience to the operatives in connection with their manipulations. The mold sections are also preferably recessed, as at 43, to permit a hook 44 to be engaged with a cross-pin 45. Hooks 44 depend from carriages 46 having, preferably, a pair of rollers 47 adapted to track the opposite lower flanged portions of the overhead I-beams. In this way, each mold section is supported individually, that is, independently of the other. The mold sections are also adapted to be locked or secured together so as to form a portable unit of all of the mold sections, or of such a number thereof as may be conveniently transferred. For locking the molds together and rendering them portable as a unit, any suitable means may be used, such as the hooks 48, which are hinged to the shouldered portions 49 of pins 50, the curved ends of the hooks being engaged about enlarged portions 51 of the pins 50 in the next mold section.

*The manifold.*—While a manifold does not need to be employed within the broad aspects of the invention, its use is preferred by many manufacturers and for a variety of reasons. Therefore, preferably, provision is made for manifolding. For this purpose, a single pipe 52, closed at one end by a plug and at the other by a valve 52', and having as many branch connections 53 secured (preferably swivelled) thereto, as at 54, as there are tires to be cured may be utilized. To sustain the pipe 52 during the assembling operations at the set-up press 2, spool rolls 55 may be provided on the carriages 46. The branches 53 which may be made of some ductile material like copper or lead, pass through the holes 41 provided in the sections and at their lower ends are preferably equipped with quick-operable connections or couplings 56 for placing the pipe 52 in communication with the valve-stems 57 of the air-bags 32 (or sealing-rings 40).

*Transferring or shifting means.*—According to the present invention, a plurality of the molds locked together are preferably moved as a unit from the set-up press to the vulcanizing press and vice versa. Overhead tracks 15 and 30, for the presses have already been mentioned. While these track sections may be joined together permanently, as when there is only one of each of the two types of presses, it is far more economical to employ a number of vulcanizing presses and enough set-up presses to always have a load of uncured articles ready to go into an empty vulcanizing press. And, therefore, it is preferable, as shown in the drawings, to employ another track section 58, which is carried by the travelling crane 3, which preferably has supporting wheels 59 following rails 60, which are supported on I-beams 31 and 31', these latter in turn being supported by a suitably constructed steel frame-work indicated at 61. The portable track 58 may be moved by any suitable means, such as the pull-chain 62 turning the wheels 59, so as to line it up with either of the track sections 15 and 30. To complete the overhead rail system and allow the necessary movements of the vulcanizing press cover 10, an additional track section 63 is preferably provided between sections 15 and 58, provision being made for moving this track section 63 from a position in alignment to a position not obstructing the mounting of the cover 10 in place. This may be done in any suitable way, as by mounting the track section 63 on a swivel 641, supported from the beam 31', as clearly shown in Figure 1 of the drawings.

*Operation.*—The use and operation of the system is believed to be obvious from the drawings and preceding description. Briefly, a batch of the molds are emptied of their cured tires at the set-up press 2, whose platen 22 is retracted, and green or uncured tires mounted on cores or air-bags, or sealing-rings such as at 40, positioned between the sections. Each mold section being independently sustained on the swivelled hooks 44 and carriages 46 may be separated from its neighbor so as to permit introduction and removal of the tires. The separation need only be wide enough to slip the tires to and from the cavities between an adjacent pair of mold sections. When the green tire has been mounted in position, the next section is pried apart and moved up against it to hold the tire in place. The cured tire thus exposed in the next cavity is removed and replaced by a green tire. The branches 53 of the manifold are connected up with the air-bag or sealing-ring, as the case may be, ready for the application of fluid under pressure therewithin. These operations are continued until the entire batch of curved tires has been replaced by green tires. These operations are more fully disclosed in my prior application Serial No. 595,050, filed October 17, 1922, to which reference is made. The molds are locked together with the hooks 48 after the ram 22 has been closed upon the batch so as to bring the molds tightly into nested relation, as shown in Figures 1 and 4 of the drawings. Then, if desired, the operator may temporarily connect the main header 52 with an outside source of pressure to test the manifold for leakage. If there is any fault in the assemblage, it can be attended to by parting the sections where the fault lies and remedying it. If none, the pressure can be lowered to a safe amount or entirely relieved.

The completely prepared batch of molds, as a unit, or in units, may then be shifted from the set-up press 2 onto the shiftable track section 58. The travelling crane 3 is moved to a position adjacent and in line with an empty vulcanizing press 1, the swivelled section 63 adjusted, and the molds moved into the empty vulcanizing press.

If the molds thus positioned in the vulcanizing press 1 have been prepared for manifolding, their header 52 is connected up (by means of the coupling 18 on the inner end of the pipeline 17) with an outside source of fluid pressure supply. At this time, the valve in the line 17 stands closed. After making the connection, the valve 52' in the header 52 is opened. The valve 52' permits a moderate amount of pressure fluid to be retained on the casings, or air-bags, when used, after the manifolding connections assembled in the set-up press 2 have been tested for leakage. But after the molds have been positioned in the vulcanizing press 1, and before closing the same, the valve 52' must be opened so that the supply of internal fluid pressure during vulcanization may be controlled by operation of the valve outside the press and in the line 17. These operations performed, the swivelled track section 63 is turned out of the way and the cover 10 lowered and locked in position behind the projections 12. Then the ram 7 is operated and the molds clamped so as to relieve the hooks 48 of strain during the curing operations. Then the line 17 is opened and a wall-compacting pressure of around 200 or more pounds to the square inch exerted on the casings during their vulcanization. If desired, to guard against chance failure of the fluid pressure on the ram 7, struts 64, mounted on the hand-operable rod 65, may then be positioned, as shown in Figure 1, to block the molds in their clamped relation. Similar struts 64' may be provided on the set-up press. It will be noticed that the struts 64 engage the mold directly and the struts 64' engage behind the movable platen 22. It is, of course, immaterial whether the struts block the molds or the platens of the two types of presses.

After a load of tires in the press have been vulcanized, the pressure supplied to the interior of the tire casings is turned off by operation of the valve in the line 17. The vulcanizing presses may be filled with water after the curing operation to cool the molds down, as heretofore. After drawing off the water, the cover 10 of the vulcanizing press is unlocked and moved aside, and the cured batch of tires in the molds pulled out and transferred to one of the set-up presses.

In Figure 7 of the drawings, a layout is shown with the vulcanizing presses 1 and the set-up presses 2 arranged in a row on one side of the path of the travelling crane 3. This arrangement is suitable where the available space is limited. The arrangement shown diagrammatically in Figure 8 is the same as that illustrated in Figure 1, the vulcanizing presses 1 being on one side of the path of the travelling crane 3 and the set-up presses 2 on the other side. It will be understood, of course, that the general layout may be varied widely but that care should be taken to provide working space on both sides of the set-up presses 2 so that operators may have free access to the molds for manipulation thereof.

It is to be understood that various changes may be made without departing from the principles of the invention above described in connection with the preferred construction. In its broadest aspects, the invention is not limited to the use of duplex molds as other suitable and convenient types may be used if required by the equipment on hand or the needs of a manufacturer. Reference should therefore be made to the appended claims for an understanding of the scope of the invention.

Having thus described my invention, what I claim and desire to protect by Letters Patent is:—

1. A vulcanizing system comprising a horizontal heater for subjecting molds to vulcanizing treatment, a set-up press in which a batch of molds may be emptied and refilled, and means intermediate the horizontal heater and the set-up press for transferring the assembled batch of molds as a unit to and from the latter, and means arranged lengthwise of the set-up press for supporting the molds in vertical planes.

2. A vulcanizing system comprising a horizontal heater for subjecting articles in molds to vulcanizing treatment, a set-up press accessible for the manipulation of the molds, means for holding a batch of molds together to form a portable unit thereof, and means for transferring the portable unit of molds to and from the press.

3. A vulcanizing system comprising a press heater for subjecting articles in molds to vulcanizing treatment, a set-up press accessible for the manipulation of the molds, means for holding a batch of molds together to form a portable unit thereof, and means for transferring the portable unit of molds to and from the press.

4. A vulcanizing system comprising a horizontal vulcanizing chamber, having a fixed platen and a power operable platen, means permitting the fixed platen to be moved from a position in line with the movable platen to a position at one side thereof, a set-up press accessible for the manipulation of the molds, and means for holding a batch of molds together to form a portable unit thereof.

5. A vulcanizing system comprising a horizontal vulcanizing press for subjecting articles in molds to heat treatment, a set-up press accessible for the manipulation of a plurality of molds when positioned therewithin, said set-up press having fixed and movable platens the former of which is in sections shiftable to opposite sides of the line of movement of the movable platen, a track for transferring a batch of molds from within the horizontal vulcanizing press to the set-up press and vice versa, means for shiftably sustaining a batch of molds from said track, and means for locking the molds together to form a portable unit thereof.

6. A vulcanizing system comprising a horizontal vulcanizing press, a set-up press, a plurality of sectional molds adapted to be locked together to form a portable unit for a press-load of articles to be cured, and means for sustaining a press-load of the sectional molds permitting them to be moved as a unit from the set-up press into the vulcanizing press and vice versa.

7. A vulcanizing system comprising a horizontal vulcanizing press adapted to be supplied with a heating medium, a set-up press having platens one of which is movable lengthwise the set-up press and the other of which is movable only laterally of the set-up press, a batch of sectional molds, means for locking the sectional molds together to form a portable unit thereof, a header with a plurality of branches constituting a manifold, said branches having ends with detachable connections for placing the header in communication with the interior of articles contained in said molds, means for sustaining the sectional molds and transferring them with the manifold as a unit to and from the set-up and vulcanizing presses, and means within the vulcanizing press for coupling the manifold to a source of fluid pressure supply located outside of the vulcanizing press.

8. A vulcanizing system comprising a plurality of horizontal vulcanizing presses, a plurality of set-up presses, each of said presses being equipped with platens for clamping molds together, overhead tracks within the vulcanizing presses and above the set-up presses, a plurality of sectional molds, means for movably sustaining the molds from said tracks, and means for transferring a batch of molds to and from the vulcanizing presses and the set-up presses, said last-named means including a shiftable track section.

9. A vulcanizing system comprising a plurality of horizontal vulcanizing presses, a plurality of set-up presses, each of said presses being equipped with platens for clamping molds together, overhead tracks within the vulcanizing presses and above the set-up presses, a plurality of sectional molds, means for movably sustaining the molds from said tracks, and means for transferring a batch of molds to and from the vulcanizing presses and the set-up presses, said last-named means including a shiftable track section, and a swivelled track section located in front of each vulcanizing press.

10. A vulcanizing system comprising a plurality of horizontal vulcanizing presses, a plurality of set-up presses each of which is accessible for the manipulation of molds, said set-up presses having a lengthwise movable platen and a split platen whose sections are movable laterally, means for blocking the movable platens in the vulcanizing presses against movement in one direction after a batch of molds have been clamped, and means for sustaining a plurality of molds and transferring them as a unit from the set-up presses to the vulcanizing presses.

11. In a vulcanizing system, the combination with a plurality of molds capable of holding in their cavities a number of tires, said molds being provided with means for holding them assembled to form a portable unit thereof, of a manifolding device portable with the molds, comprising a main header of a length approximately equal to the total thickness of the assembled molds, and branch connections joined permanently to the header at intervals approximately equal to the thickness of the molds for placing their cavities in communication with the header.

12. In a vulcanizing system, the combination with duplex mold sections for receiving a multiplicity of tires, of a manifolding device portable with the mold sections as a unit, comprising a main header of a length approximately equal to the total thickness of the assembled together mold sections, and branch connections joined permanently to the header at intervals approximately equal to the thickness of the mold sections, said mold sections carrying means for locking them together.

13. In a vulcanizing system, a horizontal vulcanizing press having a closure head or platen and a movable platen for co-operation therewith to clamp a plurality of molds together, in combination with a plurality of tire vulcanizing molds, means for holding a plurality of them together in units, and means for loading the units into the press or removing them therefrom.

14. In a vulcanizing system, the combination with a horizontal vulcanizing press, of means located outside the press for emptying and refilling the molds while supported vertically and coupling them to and uncoupling them from a manifolding device having branch connections for each mold cavity whereby a batch of the molds may be assembled in curing relation outside the press and simultaneously tested for leakage before introduction into the vulcanizing press.

15. In a vulcanizing system, a horizontal vulcanizing press comprising a vessel permanently closed at one end and adapted to be closed or opened at its opposite end, a fluid pressure cylinder mounted in the permanently closed end of said vessel, a ram carrying a platen operatively supported in said cylinder and having a stroke not greater than the diameter of the vessel, and a rail supported in the upper portion of said vessel for sustaining molds in a position to be clamped between said platen and cover.

16. In a vulcanizing system having a horizontal vulcanizing press with a movable cover and a set-up press with a laterally shiftable platen, in combination with an overhead rail system having a section supported in the upper part of the horizontal vulcanizing press, a section supported above the set-up press, a travelling section alignable with either of the first-mentioned sections, and an intermediate movable section adapted to bridge the gap between the travelling section and the section within the vulcanizing press, said movable section being shiftable from a position completing the continuity of the overhead track to a position not obstructing manipulation of the cover for the vulcanizing press.

17. In a vulcanizing system having a horizontal vulcanizing press with a movable cover and a set-up press with a laterally shiftable platen, in combination with an overhead rail system having terminal sections within said vulcanizing press and above said set-up press, and means for portably sustaining molds from said rail system.

18. In a vulcanizing system having a horizontal vulcanizing press with a movable cover and a set-up press with a laterally shiftable platen, in combination with an overhead rail system having terminal sections within said vulcanizing press and above said set-up press, and means for portably sustaining molds from said rail system, said overhead rail system including a shiftable section for temporarily bridging the opening into the vulcanizing press.

Signed at Detroit, county of Wayne, and State of Michigan, this 14th day of August, 1923.

ADRIAN O. ABBOTT, Jr.